(12) United States Patent
Leveque et al.

(10) Patent No.: US 7,494,264 B2
(45) Date of Patent: Feb. 24, 2009

(54) METHOD OF INJECTION MOLDING OR EXTRUDING A POLYMER COMPOSITION USING A LOW COMPRESSION SCREW

(75) Inventors: Alain Yves Leveque, Choisy (FR); Karl Adolf Schirmer, Nuremberg (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 874 days.

(21) Appl. No.: 11/038,898

(22) Filed: Jan. 18, 2005

(65) Prior Publication Data
US 2005/0140048 A1 Jun. 30, 2005

Related U.S. Application Data

(60) Division of application No. 10/660,236, filed on Sep. 11, 2003, now abandoned, which is a continuation of application No. 10/209,253, filed on Jul. 30, 2002, now abandoned, which is a continuation-in-part of application No. 09/585,172, filed on Jun. 1, 2000, now abandoned, which is a continuation-in-part of application No. 09/334,331, filed on Jun. 16, 1999, now abandoned, which is a continuation-in-part of application No. 09/283,516, filed on Apr. 1, 1999, now abandoned, which is a continuation-in-part of application No. 09/073,281, filed on May 6, 1998, now abandoned.

(51) Int. Cl.
*B29B 7/42* (2006.01)

(52) U.S. Cl. .......................... 366/88; 366/89

(58) Field of Classification Search ............. 366/78–79, 366/83–85, 88–90, 323, 324; 425/204, 208, 425/209
See application file for complete search history.

(56) References Cited

U.S. PATENT DOCUMENTS

| | | | | |
|---|---|---|---|---|
| 3,431,599 | A * | 3/1969 | Fogelberg | 366/89 |
| 3,737,151 | A * | 6/1973 | Schaeffer et al. | 366/75 |
| 4,118,163 | A * | 10/1978 | Lee | 425/146 |
| 4,129,386 | A * | 12/1978 | Rauwendaal | 366/88 |
| 4,173,445 | A * | 11/1979 | McKelvey et al. | 425/382.4 |
| 4,798,473 | A * | 1/1989 | Rauwendaal | 366/89 |
| 5,110,279 | A * | 5/1992 | Amemiya et al. | 425/208 |
| 5,342,125 | A * | 8/1994 | Myers | 366/89 |
| 5,419,634 | A * | 5/1995 | Bacher et al. | 366/75 |
| 5,490,725 | A * | 2/1996 | Behrens et al. | 366/76.9 |
| 5,597,525 | A * | 1/1997 | Koda et al. | 264/537 |
| 6,228,308 | B1 * | 5/2001 | Uehara et al. | 264/328.17 |

(Continued)

FOREIGN PATENT DOCUMENTS

DE 4410932 A1 * 10/1995

(Continued)

*Primary Examiner*—Charles E Cooley

(57) ABSTRACT

A method of injection molding or extruding a polymer composition having a predetermined bulk density associated with particles, granules or pellets of the polymer composition and a predetermined melt density when the polymer composition is fully melted and compressed. The method of the invention employs a screw having a volume compression ratio that is greater than or equal to the ratio of the predetermined melt density to the predetermined bulk density of the polymer composition and up to 1.25 × the ratio of the predetermined melt density to the predetermined bulk density of the polymer composition.

5 Claims, 2 Drawing Sheets

U.S. PATENT DOCUMENTS

| | | | |
|---|---|---|---|
| 6,247,836 B1 * | 6/2001 | Nakajima et al. | 366/88 |
| 2003/0016585 A1 * | 1/2003 | Leveque et al. | 366/88 |
| 2005/0041522 A1 * | 2/2005 | Leveque et al. | 366/88 |
| 2005/0073906 A1 * | 4/2005 | Hayashi | 366/75 |

FOREIGN PATENT DOCUMENTS

JP  57133038 A * 8/1982

* cited by examiner

METHOD OF INJECTION MOLDING OR EXTRUDING A POLYMER COMPOSITION USING A LOW COMPRESSION SCREW

CROSS REFERENCE TO RELATED APPLICATIONS

This application is a division of U.S. application Ser. No. 10/660,236, filed Sep. 11, 2003 now abandoned, which is a continuation of U.S. application Ser. No. 10/209,253, filed Jul. 30, 2002, now abandoned, which is a continuation-in-part of U.S. patent application Ser. No. 09/585,172, filed Jun. 1, 2000, now abandoned, which is a continuation-in-part of U.S. patent application Ser. No. 09/334,331, filed Jun. 16, 1999, now abandoned, which is a continuation-in-part of U.S. patent application Ser. No. 09/283,516, filed Apr. 1, 1999, now abandoned, which is a continuation-in-part of U.S. patent application Ser. No. 09/073,281, filed May 6, 1998, now abandoned.

BACKGROUND

1. Field of the Invention

This invention relates to the field of screws that are used, for example, to melt or soften polymer, such as in a machine for injection molding polymer or a machine for extruding polymer.

2. Description of the Related Art

The use of screws to injection mold or extrude polymer is well known. Turning to FIG. 1, there is shown a conventional or standard screw 11 for use in injection molding which includes three zones: a feeding zone 13, a compression or transition zone 15 and a metering zone 17. Screw 11 is housed in a hollow cylindrical barrel 19 having a constant inner diameter and preferably a smooth inner surface. Polymer resin, which may be in any form such as pellets, granules, flakes or powder, is fed through an opening 21 in barrel 19 into feeding zone 13 where screw 11 turns to pack and then push the pellets into compression zone 15. The pellets are melted in compression zone 15 and then pushed to metering zone 17 where the molten material is homogenized. Afterwards the homogenized melt is either injection molded or processed further.

Screw 11 has a screw shaft 23 having a thread 25 spirally positioned about shaft 23 to form flights 25. Flights 25 are characterized by their depth, which is the height of flight 25 above shaft 23 and by their pitch, which is the length P of the distance between two adjacent flights 25 plus one flight width. The outside diameter OD of a screw 11 includes the depth of a flight 25 above and below shaft 23, whereas the root diameter RD of screw 11 is the diameter of shaft 23 only, without including the depth of flights 25. Conventionally flights 25 in a screw 11 have the same pitch in each of feeding zone 13, compression zone 15 and metering zone 17, but have a changing depth from zone to zone. Specifically, flights 25 have a constant depth x in feeding zone 13, a constant depth y in metering zone 17 where y<x, and a gradually decreasing depth of x to y in compression zone 15.

Screws are often characterized by their compression ratio, which is a ratio that is used to quantify the amount the screw compresses or squeezes the resin. The concept behind the compression ratio is to divide the volume of a flight in the feed section by the volume of a flight in the metering section, but the actual standard that is used is a simplified method based on the following equation:

$$\text{Compression ratio} = \frac{\text{depth of flight in feeding zone}}{\text{depth of flight in metering zone}}$$

This compression ratio is referred to as the depth compression ratio. High compression screws, which are usually used for crystalline or semi-crystalline materials, such as polymers, have compression ratios of greater than about 2.5. Standard compression screws, which are usually used for amorphous materials, have compression ratios of from about 1.8 to about 2.5, more commonly 2.2.

Various problems with high compression screws include: overheating caused by compression that is too high or is uncontrolled; "bridging", which is when the polymer melt turns with the screw and is not pushed forward; and screw deposit which builds up in the compression and metering zones. These problems limit the maximum screw rotation speed and by consequence the output of molten material. In an attempt to overcome these problems some users switch to standard screws, but the depth of the flight in the metering zone of a standard screw is too high to give good melt homogeneity under some conditions, especially with crystalline materials.

Many attempts have been made to improve the performance of screws. U.S. Pat. No. 4,129,386, discloses an extrusion device which has a grooved barrel in combination with a screw having a helix angle or pitch D in the feed zone that constantly increases through a transition zone to a helix angle F in the metering zone. The feed zone has a constant flight height G, the metering zone has a constant flight I, and the t transition zone has a constantly decreasing flight height from feed zone flight height G to metering zone flight height I. This screw design suffers from problems of overfeeding of the material to be extruded, and requires a grooved barrel in order to prevent buildup of excessive pressure gradients along the screw.

What is needed, therefore, is a screw which will produce a homogeneous melt without the problems associated with screws having a high compression ratio.

SUMMARY OF THE INVENTION

The present invention relates to a screw for use in, for example, an injection molding machine or an extruder. The screw includes a screw shaft having a thread spirally positioned about the screw shaft so as to form a plurality of flights which are divided into three zones: a feeding zone, a compression zone and a metering zone.

The depth, width and pitch of the flights of the screw are designed based upon the material to be used in the screw so that the difference in the ratio of the actual volumetric flow to the theoretical volumetric drag flow of material in the feeding zone and the ratio of the actual volumetric flow to the theoretical volumetric drag flow of material in the metering zone is less than 0.2, preferably less than 0.1, and more preferably less than 0.05. In a preferred embodiment the ratio of the actual volumetric flow to the theoretical volumetric drag flow of material in the feeding zone and/or the ratio of the actual volumetric flow to the theoretical volumetric drag flow of material in the metering zone is from about 0.8 to 1.0.

This design results in a screw which has a balanced mass flow throughout the screw, and thus a constant pressure gain along the screw without pressure peaks.

An example of a screw that has the desired difference in the ratio of the actual volumetric flow to the theoretical volumetric drag flow of material in the feeding zone and the ratio of the actual volumetric flow to the theoretical volumetric drag flow of material in the metering zone is a screw in which the pitch of at least a portion of the flights in the metering zone is greater than the pitch of at least a portion of the flights in the feeding zone; the pitch of at least a portion of the flights in the feeding zone is less than the outside diameter of the screw; the pitch of at least a portion of the flights in the metering zone is greater than the outside diameter of the screw; the pitch of at least a portion of the flights increases through the compression zone; and the depth of at least a portion of the flights decreases through the compression zone moving from nearer the feeding zone to nearer the metering zone.

The invention also relates to a method for designing a screw such that each flight of the screw has the same mass of material, taking into account the physical state of the material in such flight, either as unmelted pellets or granules of material, partially melted pellets or granules of material, or completely melted material. To obtain this constant mass, the volume of each flight of the screw is designed in such a way that the compression ratio in volume of a flight in the feeding zone to the volume of a flight in the metering zone equals the ratio of the melt density/bulk density of the material to be used in the screw. It is preferred that the volume compression ratio of the screw is increased above the melt density/bulk density ratio by a factor of up to about 25% to be sure that there is a continuous homogenous feeding of the melt in the screw. The physical design of the screw is then only a consequence of this method of design.

The inventive screw allows a higher screw rotation speed, has a higher throughput, and decreases the injection molding cycle time compared to conventional screws.

DETAILED DESCRIPTION

Figure 1:
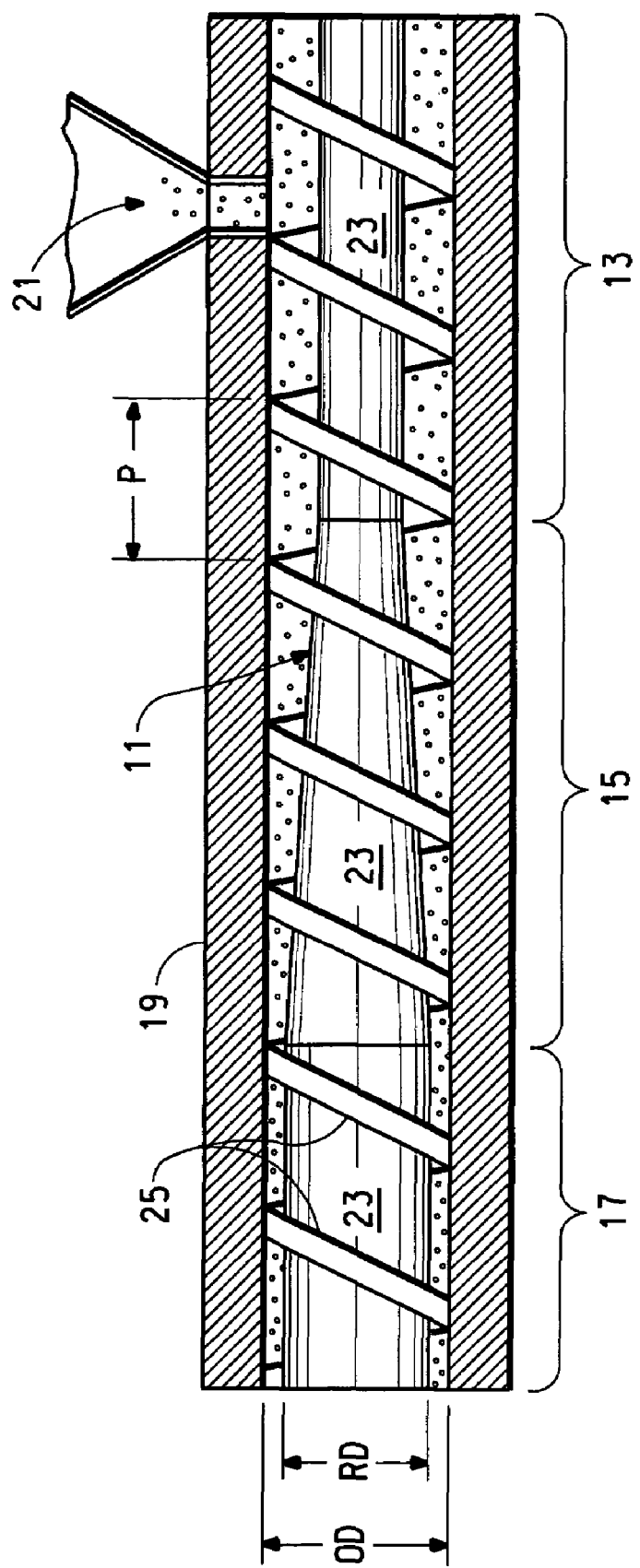
FIG. 1 is a side view in elevation of a standard screw.

The present invention relates to a screw for use in, for example, an injection molding machine or an extruder. The screw includes a screw shaft having a thread spirally positioned about the screw shaft so as to form a plurality of flights. The screw has three zones: a feeding zone, a compression zone and a metering zone, and in use is mounted in a hollow cylindrical barrel having a preferably smooth inner cylindrical wall which allows the screw to rotate within the hollow barrel.

As used herein, the term "feeding zone" refers to that zone of the screw where the material has not been melted. In the case of polymer pellets, for example, the pellets are present in their unmelted bulk form. The term "metering zone" refers to that zone of the screw where the material has been fully compressed. In the case of resin pellets, for example, the pellets are present in a completely molten form. The term "compression zone" refers to that zone of the screw where the material is compressed. In the case of polymer pellets, for example, the pellets are present in a mixed state between their bulk form and molten form.

A flight is characterized by its depth, which is defined as the height of the flight above the screw shaft, by its width, and by its pitch, which is defined as flight length (the distance between two adjacent turns of the flight on the screw shaft) plus one flight width. If the flight has a pitch of 25 mm, it means that when the screw is rotated once, the polymer in the flight is moved axially 25 mm in the screw.

The present invention is based on the discovery that if the design of the flights is based upon the mass of the material to be present in the flights there is obtained a screw having a higher screw rotation speed, a higher throughput, and a decrease in injection molding cycle time compared to conventional screws.

Thus, the invention relates to a screw comprising a screw shaft having a thread spirally positioned about the screw shaft so as to form a plurality of flights, said screw having a feeding zone, a compression zone and a metering zone. The screw has means formed in said screw for providing a mass of material in a flight in the feeding zone that is substantially the same as the mass of material in a flight in the metering zone, wherein said means includes flights formed in the metering zone having a pitch and depth based upon the volume of the material in a molten state and flights formed in the feeding zone having a pitch and depth based upon the volume of the material in a bulk state.

Stated another way, in the present invention the depth, width and pitch of the flights of the screw are designed based upon the material to be used in the screw so that the absolute difference in the ratio of the actual volumetric flow to the theoretical volumetric drag flow of material in the feeding zone and the ratio of the actual volumetric flow to the theoretical volumetric drag flow of material in the metering zone is less than 0.2, preferably less than 0.1, and more preferably less than 0.05.

This invention results in a screw which has a balanced mass flow along the screw, and thus a constant pressure gain along the screw without pressure peaks. In a preferred embodiment the ratio of the actual volumetric flow to the theoretical volumetric drag flow of material in the feeding zone and the ratio of the actual flow to the theoretical drag flow of material in the metering zone is from about 0.8 to 1.0.

The above ratios may be calculated on a volume per time basis.

The actual flow of material and the theoretical drag flow of material in the feeding zone and the metering zone are determined as follows.

The actual flow of material in the metering zone is determined by weighing the output of material from the screw over a given period of time. This mass flow rate may be converted into a volumetric flow rate by dividing the mass flow rate by the melt density of the material used in the screw. By "melt density" is meant the density of the material, such as polymer, used in the screw when the material has been melted.

The mass flow rate of material in the screw is assumed to be constant, and the actual volumetric flow of material in the feeding zone is determined by taking the mass flow rate of material from the metering zone and dividing that mass flow rate by the bulk density of the material used in the screw. By "bulk density" is meant the mass of the material, such as polymer particles or granules, used in the screw divided by the total volume of the solid particles or granules and the voids or open spaces between them.

By "drag flow" is meant the theoretical volumetric flow of material which results from the relative movement between the screw and the internal surface of the screw barrel, that is, the forward flow of material due to the turning of the helical screw which forces the material forward and through the barrel. Drag flow is proportional to the product of the average relative velocity of the material and the channel cross-sectional area of the cylindrical barrel. In other words, the drag flow is the volumetric pumping capacity of material, and is usually calculated on a volume per time basis. Drag flow is based on a number factors related to the screw including the pitch, depth, width and angle of the flights, and the speed of the screw. The drag flow, which is directed toward the outlet end of the screw, may be increased by increasing the speed of the screw and/or by increasing the depth of the flights of the screw or by increasing the pitch of the flights of the screw.

The theoretical volumetric drag flow is calculated using well known, conventional formulae such as shown in Gerhard Schenkel, "Kunststoff-Extrudertechnik," published by Carl Hanser Verlag, Munich (1963), pp. 123-125.

The theoretical volumetric drag flow calculated for the feeding zone must be adjusted by a correction factor related to the geometry of the flights in that zone and the material used in the screw. This correction factor is necessary because of the bulk nature of the material in the feeding zone and the influence of the flanks of the flights, and is normally in the range of 0.7 to 0.95, more typically in the range of 0.8 to 0.95. The correction factor may be obtained using known methods, such as shown on page 123 of Schenkel where there is presented a graph of the ratio of flight height to flight length to correction factor. The correction factor is determined by taking the ratio of the flight height to flight length and reading an appropriate correction factor from the chart.

While theoretically the calculation of the theoretical volumetric drag flow in the metering zone also needs to be adjusted by a correction factor, in fact the correction factor is very close to 1.0 because in the metering zone the material is molten and because the ratio of the flight height to the flight pitch is very low, and thus this correction factor is approximated as 1.0.

A screw having the ratios described above has a relatively constant pressure gain per pitch along the screw. If pressure peaks occur in a screw, stress will be applied to the material in the screw which will result in screw deposit and a decrease in the mechanical properties of the material.

There is no limitation on the type of material that may be used in the screw, although the screw has been found to be especially useful in injection molding and extruding polymers. An example of a screw that has the desired difference in the ratio of the actual volumetric flow to the theoretical volumetric drag flow of material in the feeding zone and the ratio of the actual volumetric flow to the theoretical volumetric drag flow of material in the metering zone is a screw in which:

the pitch of at least a portion of the flights in the metering zone is greater than the pitch of at least a portion of the flights in the feeding zone;

the pitch of at least a portion of the flights in the feeding zone is less than the outside diameter of the screw;

the pitch of at least a portion of the flights in the metering zone is greater than the outside diameter of the screw;

the pitch of at least a portion of the flights increases through the compression zone; and the depth of at least a portion of the flights decreases through the compression zone moving from nearer the feeding zone to nearer the metering zone.

In a preferred embodiment, the geometry of the flights is such that the pitch of the flights in the metering zone is greater than the pitch of the flights in the feeding zone, the pitch of the flights in the feeding zone is less than the outside diameter of the screw, the pitch of the flights in the metering zone is greater than the outside diameter of the screw, the pitch of the flights increases through the compression zone, and the depth of the flights decreases through the compression zone moving from nearer the feeding zone to nearer the metering zone. As used herein, the term "outside diameter of the screw" means the diameter as measured to include the screw shaft and the depth of the flight above and below the screw shaft.

The compression ratio of a screw quantifies the relative amount a screw compresses a resin, and is based on the concept of dividing the volume of a flight in the feeding zone by the volume of a flight in the metering zone. An approximation that is normally used as the compression ratio is the ratio of the depth of the flights in the feeding zone to the depth of the flights in the metering zone.

Thus, the usual method for changing the compression ratio of a screw has been to change the depth of the flights in the feeding and metering zones. Since the depth of the flights in conventional screws is constant in the feeding zone and constant in the metering zone, the compression ratio of the screw would be increased by increasing the depth of the flights in the feeding zone, or decreasing the depth of the flights in the metering zone, or doing both. However, if the compression ratio of the screw is too high it leads to the problems discussed above, namely, bridging and the build up of undesirable heat build up and screw deposits.

The present invention is based on the discovery that one can obtain the benefits of a high compression screw having a relatively high depth of flights in the feeding zone and relatively small depth of flights in the metering zone without the disadvantages associated with a high compression screw, by providing a screw having an absolute difference in the ratio of the actual volumetric flow to the theoretical volumetric drag flow of material in the feeding zone and the ratio of the actual volumetric flow to the theoretical volumetric drag flow of material in the metering zone is less than 0.2, preferably less than 0.1, and more preferably less than 0.05.

In effect, changing the pitch and the depth of the screw of the invention, as described above, lowers the volumetric compression ratio of the screw substantially, and thereby removes the disadvantages associated with a high compression ratio screw. At the same time the screw of the invention provides all the benefits associated with the relatively high feeding zone flight depths and relatively low metering zone flight depths associated with a high compression ratio screw.

The compression ratio volume, calculated by taking the ratio of the feeding zone volume to the compression zone volume, is not simple to measure when both the pitch and the depth of the flights of the screw change. One reason is that the changing pitch causes a variation in the angle of the flights along the screw shaft. It has been discovered that the compression ratio volume for a screw having a changing flight pitches and changing flight depths may be approximated by taking the ratio of the melt density to the bulk density for the polymer to be used with the screw.

The ratio of the melt density to the bulk density for many polymer materials is approximately equal to 1.3, and this value of 1.3 is a minimum for the compression ratio of the screw. Below a ratio of 1.3, the polymer granules are not compressed enough to push entrapped air out of the polymer during the injection molding process.

With the present invention, improved results have been obtained with a screw having very low compression ratio, i.e., equivalent to the lower limit of 1.3 or higher but lower than the compression ratio of a high compression screw.

The discovery that a screw could be made and used successfully designed based upon a small difference in the ratio of the actual volumetric flow to the theoretical volumetric drag flow of material in the feeding zone and the ratio of the actual volumetric flow to the theoretical volumetric drag flow of material in the metering zone and with different pitches in the feeding and metering zones, and a changing pitch in the compression zone, was unexpected in view of the conventional teaching that the screw designed based on the volume of material in the flights and should have same pitch in each of the feeding, compression and metering zones.

The invention also relates to a method for designing a screw such that each flight of the screw has substantially the same mass of material, taking into account the physical state of the material in a flight, either as unmelted pellets or granules of material in the feeding zone, partially melted pellets or granules of material in the compression zone, or completely melted material in the metering zone. To obtain this constant mass, the volume of each flight of the screw is designed in such a way that the compression ratio in volume, that is, the ratio of the volume of a flight in the feeding zone to the volume of a flight in the metering zone equals the ratio of the melt density/bulk density of the material to be used in the screw. It is preferred that the compression ratio of the melt density/bulk density be increased up to about 25%, preferably no more than 10%, to be sure that there is a continuous homogenous feeding of the melt in the screw. The physical design of the screw is then only a consequence of this method of designing the screw.

The inventive method for designing the screw for use in injection molding or extrusion, which screw comprises a screw shaft having a thread spirally positioned about the screw shaft so as to form a plurality of flights, said screw having a feeding zone, a compression zone and a metering zone, may be characterized as follows. First, the material to be used in the screw is selected. Next, the diameter of the screw to be used is selected. As used herein "diameter" includes the total distance as measured from the outer edge of the flights, and not just the diameter of the screw shaft.

The depth and pitch of a flight in the metering zone are selected because this depth and pitch, in combination with the diameter of the screw, will determine the output capacity of the melt from the screw at a given turning speed of the screw. The depth of a flight in the metering zone is selected so as to provide a screw that, in operation, produces a molten material that has a homogeneous melt quality. One way to estimate the pitch for a flight in the metering zone is the provide a pitch that is from about 1 to 2 times the diameter of the screw.

The mass of material in a flight in the metering zone is determined based upon the volume of a flight in the metering zone and the melt density of the material. The volume of a flight needed in the feeding zone to provide the same mass of material as is present in a flight in the metering zone is determined by taking the mass of material in a flight in the metering zone and then calculating the volume that material would have in its unmelted state using the bulk density of the material. As a starting point, one may estimate the depth of a flight in the feeding zone to be 20% of the diameter of the screw. The depth and pitch of the flights in the feeding zone are adjusted so as to give a compression ratio for the screw which is about the same as the ratio of the melt density to the bulk density of the material. In order to assure a homogenous melt, this compression ratio may be increased up to about 25%, preferably no more than 10%.

The depth and pitch of the flights in the compression zone of the screw are determined so as to provide a mass of material in each flight of the screw that is substantially constant. By "substantially constant" is meant a mass of material that is up to about 110%, preferably no more than 105%, of the mass of material in the flight of the metering zone designed above.

Stated another way, once the diameter of the screw and the material to be used in the screw are selected, the depth and pitch of the flights in the feeding zone, compression zone and metering zone are chosen so as to provide an absolute difference in the ratio of the actual volumetric flow to the theoretical volumetric drag flow of material in the feeding zone and the ratio of the actual volumetric flow to the theoretical volumetric drag flow of material in the metering zone is less than 0.2, preferably less than 0.1.

Once the material and the screw diameter have been selected, one obtains the depth of a flight in the metering zone. Then, a rotating speed for the screw is selected and the pitch of a flight in the metering zone is determined. As was stated above, one way to estimate the pitch for a flight in the metering zone is the provide a pitch that is from about 1 to 2 times the diameter of the screw. With these factors determined the theoretical volumetric drag flow of material in the metering zone may be determined.

The theoretical volumetric drag flow of the material in the feeding zone is determined by multiplying the theoretical volumetric drag flow of material in the metering zone by the compression ratio of the screw, that is, by the ratio of melt density to bulk density of the material to be used in the screw. As stated above, the theoretical volumetric drag flow of the material in the feeding zone may be increased up to about 25%, preferably no more than 10%, to provide for a slightly higher pressure to be sure of a constant output of material from the screw.

The depth and pitch of a flight in the feeding zone is then determined. A starting point for selecting the depth of the flight is to use 20% of the diameter of the screw. The depth and pitch of the remaining flights of the screw are determined so as to provide a substantially constant mass of material in each flight of the screw.

The output of the screw is determined and the actual flow of material from the screw may be measured or calculated. Thus, one may determine the absolute difference in the ratio of the actual volumetric flow to the theoretical volumetric drag flow of material in the feeding zone and the ratio of the actual volumetric flow to the theoretical volumetric drag flow of material in the metering zone. A screw designed according to this method an absolute difference in the ratio of the actual volumetric flow to the theoretical volumetric drag flow of material in the feeding zone and the ratio of the actual volumetric flow to the theoretical volumetric drag flow of material in the metering zone is less than 0.2, preferably less than 0.1.

Figure 2:
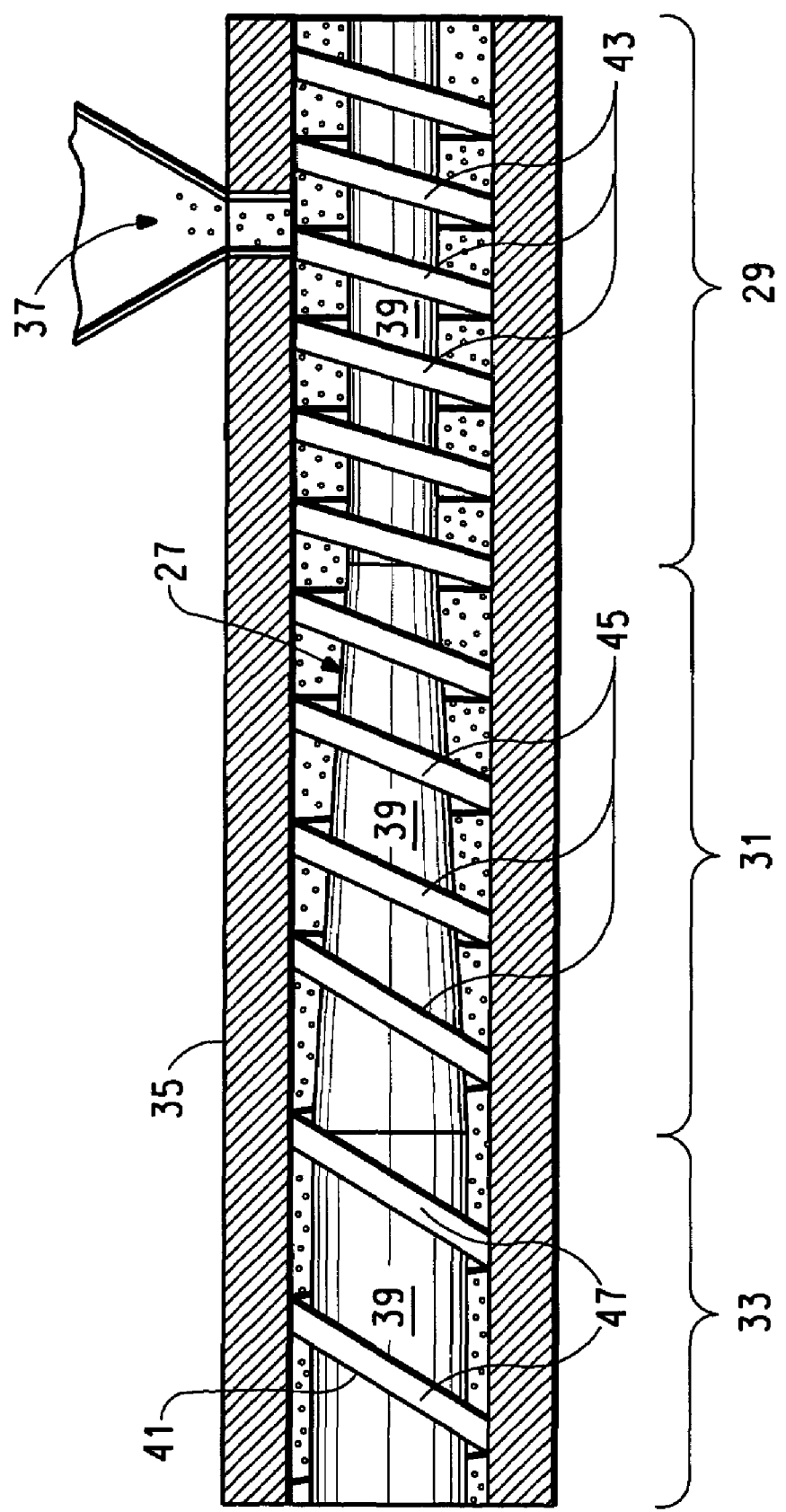
FIG. 2 is a side view in elevation of a screw made in accordance with this invention.

The features of the screw of the present invention allow the screw to have a higher screw rotation speed, a higher throughput, and a decrease in injection molding cycle time compared to conventional screws. The invention is illustrated in FIG. 2 where there is shown a screw 27 having a feeding zone 29, a compression zone 31 and a metering zone 33. Screw 27 is housed in a hollow cylindrical barrel 35 having a substantially constant inner diameter. Polymer resin, which may be in any convenient form, such as pellets, granules, flakes or powder, is fed through opening 37 in barrel 35 into feeding zone 29 where screw 27 turns to pack and then push the pellets into compression zone 31 as with a conventional screw.

Screw 27 has a screw shaft 39 and a thread 41 spirally positioned about shaft 39 to form feeding zone flights 43, compression zone flights 45 and metering zone flights 47.

The pitch of feeding zone flights 43 is smaller than the outside diameter of screw 27, and, in a preferred embodiment, the pitch of each of feeding zone flights 43 is approximately equal. The pitch of metering zone flights 47 is larger than the outside diameter of screw 27, and, in a preferred embodiment, the pitch of each of metering zone flights 47 is also approximately equal. Further, the pitch of feeding zone flights 43 is smaller than the pitch of metering zone flights 47.

As is shown in FIG. 2, the depth of compression zone flights 45 gradually decreases moving from nearer feeding zone 29 towards metering zone 33, and the pitch of compression zone flights 45 gradually increases moving from nearer feeding zone 29 towards metering zone 33. The change in depth of compression zone flights 45 is obtained because in compression zone 31 screw shaft 39 has the shape of a tapered cone. While the depth of compression zone flights 45 decreases while moving from nearer feeding zone 29 towards metering zone 33, it is not necessary that the depth of each successive compression zone flight 45 be smaller than the previous one. Similarly, while the pitch of compression zone flights 45 increases from nearer feeding zone 29 towards metering zone 33, it is not necessary that the pitch of each successive compression zone flights 45 be larger than the previous one.

The inventive screw may be used in an injection molding machine, or an extruder, or it may be used as the melting section of a larger screw.

While the invention has been illustrated as having one flight, as is known to those skilled in the art, the scope of the present invention includes a screw having more than one flight.

EXAMPLES

Example 1 and Comparative Example 2

In Example 1 a screw according to the invention was made and in Comparative Example 2 a conventional screw was made. The physical dimensions of the screws are set forth in Table 1 below.

Delrin® 500 P, a polyacetal resin available from E. I. du Pont de Nemours and Company (DuPont), was injection molded using both screws. The resin had a ratio of melt density/bulk density of 1.16/0.87=1.33. The results are summarized in Table 1 below.

TABLE 1

|  | Example 1 | Comparative Example 2 |
|---|---|---|
| Screw diameter, mm | 30 | 30 |
| Depth of flights in the feeding zone, mm | 8 | 7 |
| Pitch of flights in the feeding zone, mm | 28 | 30 |
| Depth of flights in the metering zone, mm | 2.3 | 2.2 |
| Pitch of flights in the metering zone, mm | 50 | 30 |
| Screw speed (rpm) | 250 | 125 |
| Screw output (kg/hr) | 61 | 25 |
| Compression ratio (volume) | 1.47 | 2.6 |
| Feeding zone actual flow, liters/hr | 72 | 29 |
| Feeding zone drag flow correction factor | 0.81 | — |
| Feeding zone theoretical drag flow, liters/hr | 73 | 37 |
| Ratio of feeding zone actual flow to theoretical drag flow | 0.98 | 0.78 |
| Metering zone actual flow, liters/hr | 54 | 22 |
| Metering zone theoretical drag flow, liters/hr | 54 | 17 |
| Ratio of metering zone actual flow to theoretical drag flow | 1.00 | 1.25 |
| Difference in ratio of actual flow to theoretical drag flow in feeding zone and metering zone | 0.02 | 0.47 |

The screw of Example 1 had a small difference in the ratio of the actual flow to the theoretical drag flow of material in the feeding zone and the ratio of the actual flow to the theoretical drag flow of material in the metering zone compared to the screw of Comparative Example 2. Thus, the screw of Example 1 produced a homogenous melt, a more consistent screw retraction time and allowed a higher RPM, that is, a higher output of resin that the screw of Comparative Example 2 without creating screw deposit, splays, bridging, or other defects.

Example 3 and Comparative Example 4

Zytel® 135 F, a nylon resin available from DuPont, was also injection molded as in the previous Examples. The resin had a ratio of melt density to bulk density of 0.94/0.67=1.40. In Example 3, the resin was injection molded using a screw according to the invention and in Example 4, the resin was injection molded using a screw according to the prior art. The results are summarized in Table 2 below.

TABLE 2

|  | Example 3 | Comparative Example 4 |
|---|---|---|
| Screw diameter, mm | 32 | 32 |
| Depth of flights in the feeding zone, mm | 8 | 5.9 |
| Pitch of flights in the feeding zone, mm | 26 | 32 |
| Depth of flights in the metering zone, mm | 2.1 | 2.1 |
| Pitch of flights in the metering zone, mm | 48 | 32 |
| Screw speed (rpm) | 275 | 300 |
| Screw output (kg/hr) | 40 | 33 |
| Compression ratio (volume) | 1.56 | 2.4 |
| Feeding zone actual flow, liters/hr | 59 | 48 |
| Feeding zone drag flow correction factor | 0.80 | — |
| Feeding zone theoretical drag flow, liters/hr | 81 | 76 |
| Ratio of feeding zone actual flow to theoretical drag flow | 0.73 | 0.64 |
| Metering zone actual flow, liters/hr | 42 | 35 |
| Metering zone theoretical drag flow, liters/hr | 58 | 36 |
| Ratio of metering zone actual flow to theoretical drag flow | 0.73 | 0.95 |
| Difference in ratio of actual flow to theoretical drag flow in feeding zone and metering zone | 0 | 0.31 |

The screw of Example 3 had no difference in the ratio of the actual flow to the theoretical drag flow of material in the feeding zone and the ratio of the actual flow to the theoretical drag flow of material in the metering zone compared to a difference of 0.31 for the screw of Comparative Example 4. Thus, the screw of Example 3 produced a homogenous melt, a more consistent screw retraction time and allowed a higher RPM, that is, a higher output of resin that the screw of Comparative Example 4 without creating screw deposit, splays, bridging, or other defects.

Example 5 and Comparative Example 6

Delrin® 500 P is injection molded as in the previous Examples using a screw having a diameter of 65 mm. In Example 3, the resin is injection molded using a screw according to the invention and in Example 4, the resin is injection molded using a screw according to the prior art. The results are summarized in Table 3 below.

TABLE 3

|  | Example 5 | Comparative Example 6 |
|---|---|---|
| Screw diameter, mm | 65 | 65 |
| Depth of flights in the feeding zone, mm | 10 | 7.8 |
| Pitch of flights in the feeding zone, mm | 40 | 65 |
| Depth of flights in the metering zone, mm | 2.7 | 2.8 |
| Pitch of flights in the metering zone, mm | 75 | 65 |
| Screw speed (rpm) | 180 | 140 |
| Screw output (kg/hr) | 185 | 110 |
| Compression ratio (volume) | 1.6 | 2.5 |
| Feeding zone actual flow, liters/hr | 212 | 127 |
| Feeding zone drag flow correction factor | 0.84 | — |
| Feeding zone theoretical drag flow, liters/hr | 248 | 279 |
| Ratio of feeding zone actual flow to theoretical drag flow | 0.85 | 0.46 |
| Metering zone actual flow, liters/hr | 159 | 95 |
| Metering zone theoretical drag flow, liters/hr | 170 | 121 |
| Ratio of metering zone actual flow to theoretical drag flow | 0.93 | 0.79 |
| Difference in ratio of actual flow to theoretical drag flow in feeding zone and metering zone | 0.08 | 0.33 |

The screw of Example 5 has a small difference in the ratio of the actual flow to the theoretical drag flow of material in the feeding zone and the ratio of the actual flow to the theoretical drag flow of material in the metering zone compared to a difference of 0.33 for the screw of Comparative Example 6. Thus, the screw of Example 5 produces a homogenous melt, a more consistent screw retraction time and allowed a higher RPM, that is, a higher output of resin that the screw of Comparative Example 6 without creating screw deposit, splays, bridging, or other defects.

We claim:

1. A method of injection molding or extruding a polymer composition using an apparatus that includes a screw adapted for being housed in a cylindrical barrel having a substantially constant inner diameter, said polymer composition having a predetermined bulk density associated with particles, granules or pellets of said composition and a predetermined melt density when said polymer composition is fully melted and compressed, said screw comprising:

a screw shaft defining a longitudinal axis and having a thread spirally positioned about the longitudinal axis of the shaft;

said spirally positioned thread defining a substantially constant outside diameter of the screw that is less than the inner diameter of the cylindrical barrel;

said spirally positioned thread defining a pitch along said screw shaft;

said screw shaft defining a root diameter that is less than the outside diameter of the screw;

said screw defining a feeding zone, a compression zone and a metering zone along its longitudinal axis;

said pitch of said spirally positioned thread and said root diameter of said screw shaft in said feeding zone and said metering zone defining a volume compression ratio;

said method comprising the steps of:

providing said screw wherein said pitch of said spirally positioned thread and said root diameter of said screw shaft in said feeding zone and said metering zone cause said volume compression ratio to be greater than or equal to the ratio of the predetermined melt density to the predetermined bulk density of the polymer composition and up to 1.25× the ratio of the predetermined melt density to the predetermined bulk density of the polymer composition;

feeding particles, granules or pellets of said polymer composition into said feeding zone;

heating said polymer composition to a temperature sufficient to cause said particles, granules or pellets to melt;

rotating said screw with respect to said cylindrical barrel so as to cause said particles, granules or pellets to compress in said compression zone while melting and forcing said fully melted and compressed polymer composition to exit the metering zone.

2. The method in accordance with claim 1 wherein said volume compression ratio is greater than or equal to the ratio of the predetermined melt density to the predetermined bulk density of the polymer composition and up to 1.10× the ratio of the predetermined melt density to the predetermined bulk density of the polymer composition.

3. The method in accordance with claim 1 wherein said volume compression ratio is equal to the ratio of the predetermined melt density to the predetermined bulk density of the polymer composition.

4. The method in accordance with claim 1 wherein the ratio of the predetermined melt density to the predetermined bulk density of the polymer composition is approximately 1.3.

5. The method in accordance with claim 1 wherein the ratio of the predetermined melt density to the predetermined bulk density of the polymer composition is approximately 1.4.

* * * * *